United States Patent
An et al.

(10) Patent No.: US 8,597,534 B2
(45) Date of Patent: Dec. 3, 2013

(54) MAGNETIC MATERIAL COMPOSITION FOR CERAMIC ELECTRONIC COMPONENT, METHOD OF MANUFACTURING THE SAME, AND CERAMIC ELECTRONIC COMPONENT USING THE SAME

(75) Inventors: Sung Yong An, Gyunggi-do (KR); Ic Seob Kim, Gyunggi-do (KR); Sung Lyoung Kim, Gyunggi-do (KR); Soo Hwan Son, Seoul (KR); Jin Woo Hahn, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 321 days.

(21) Appl. No.: 13/033,909

(22) Filed: Feb. 24, 2011

(65) Prior Publication Data
US 2012/0126165 A1   May 24, 2012

(30) Foreign Application Priority Data
Nov. 18, 2010   (KR) .................. 10-2010-0115288

(51) Int. Cl.
*C04B 35/26*   (2006.01)
(52) U.S. Cl.
USPC .................................... 252/62.58
(58) Field of Classification Search
USPC ....... 252/62.51 R, 62.55, 62.56, 62.58, 62.62
See application file for complete search history.

(56) References Cited

U.S. PATENT DOCUMENTS 4,016,057 A  *  4/1977  Dezawa et al. ............... 148/105
5,476,728 A  *  12/1995  Nakano et al. ................ 428/815

FOREIGN PATENT DOCUMENTS

| | | |
|---|---|---|
| EP | 86444 A1 * | 8/1983 |
| JP | 2006-052100 | 2/2006 |
| JP | 2010-235324 A | 10/2010 |

OTHER PUBLICATIONS

Korean Office Action, and English translation thereof, issued in Korean Patent Application No. 10-2010-0115288 dated Aug. 29, 2012.

* cited by examiner

*Primary Examiner* — Emily Le
*Assistant Examiner* — Lynne Edmondson
(74) *Attorney, Agent, or Firm* — McDermott Will & Emery LLP

(57) ABSTRACT

There are provided a composition for a ceramic electronic component having excellent sinterability and magnetic characteristics (Q), a manufacturing method thereof, and an electronic component using the same. The magnetic material composition for the ceramic electronic component is composed of ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of ferric oxide may be substituted with boron oxide ($B_2O_3$). The ceramic electronic component manufactured by using the magnetic material composition for the ceramic electronic component has an excellent Q.

10 Claims, 6 Drawing Sheets

MAGNETIC MATERIAL COMPOSITION FOR CERAMIC ELECTRONIC COMPONENT, METHOD OF MANUFACTURING THE SAME, AND CERAMIC ELECTRONIC COMPONENT USING THE SAME

CROSS-REFERENCE TO RELATED APPLICATIONS

This application claims the priority of Korean Patent Application No. 2010-0115288 filed on Nov. 18, 2010, in the Korean Intellectual Property Office, the disclosure of which is incorporated herein by reference.

BACKGROUND OF THE INVENTION

1. Field of the Invention

The present invention relates to a magnetic material composition for a ceramic electronic component, a method of manufacturing the same, and a ceramic electronic component using the same, and more particularly, to a magnetic material composition for a ceramic electronic component having excellent sinterability and magnetic characteristics (Q), a method of manufacturing the same, and a ceramic electronic component using the same.

2. Description of the Related Art

With the development of various electronic communications devices such as cellular phones and the like, the demand for a multilayer electronic component is gradually increasing, in order to implement various functions of an electronic circuit board. In the multilayer ceramic electronic component manufactured by a magnetic ceramic material, since an internal wiring circuit is made of Ag, Cu, or the like, which is a low melting point material, a magnetic ceramic material which may be sintered at a low temperature is required.

In general, nickel-zinc ferrite, nickel-zinc-copper ferrite, or the like is primarily used as a magnetic material of a low-temperature sintered magnetic material ceramic component such as a multilayer chip inductor, a multilayer chip bead, a power inductor, and the like. A nickel (Ni)-zinc (Zn)-Copper (Cu) ternary composition contains copper in order to improve a sintering characteristic of nickel-zinc ferrite. Fe may be substituted with positive trivalent ions such as Al, Cr, and the like or positive tetravalent ions such as Sn, Ti, and the like, and Ni, Zn, and Cu may be substituted with positive divalent ions such as Mn, Co, Mg, and the like.

In order to improve magnetic characteristics of nickel-zinc-copper ferrite, NiO, ZnO, CuO, and $Fe_2O_3$ are used as main ingredients, and $Li_2O$, $SnO_2$, $Co_3O_4$, $Bi_2O_3$, $Mn_3O_4$ which are sub ingredients of 5 wt % or less, with respect to the main ingredients, are added to control initial permeability, sintering density, saturated magnetization, and the like. However, the materials added as the sub ingredients are not completely solid-soluble at an A-site or a B-site within a ferrite lattice, thereby generating hematite ($\alpha$-$Fe_2O_3$) or a secondary phase such as CuO, $Cu_2O$, or the like. As a result, the magnetic characteristic of the nickel-zinc-copper ferrite is reduced.

SUMMARY OF THE INVENTION

An aspect of the present invention provides a magnetic material composition for a ceramic electronic component having excellent magnetic characteristics, a method of manufacturing the same, and a ceramic electronic component using the same.

According to an aspect of the present invention, there is provided a magnetic material composition for a ceramic electronic component including: nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$).

The content of the boron oxide ($B_2O_3$) may be in the range of 0.05 to 1.0 part by mole.

The magnetic material composition may further include silver nitrate ($AgNO_3$).

The content of the silver nitrate ($AgNO_3$) may be in the range of 0.01 to 0.5 part by weight with respect to the nickel-zinc-copper ferrite powder of 100 parts by weight.

According to another aspect of the present invention, there is provided a method of manufacturing a magnetic material composition for a ceramic electronic component, the method including: preparing raw materials including ferric oxide ($Fe_2O_3$), nickel oxide (NiO), zinc oxide (ZnO), copper oxide (CuO), and boron oxide ($B_2O_3$); mixing and liquid-milling the raw materials; and manufacturing nickel-zinc-copper ferrite powder by drying and calcining the liquid-milled mixture.

The method may further include mixing silver nitrate ($AgNO_3$) with the manufactured nickel-zinc-copper ferrite powder after the manufacturing of the nickel-zinc-copper ferrite powder by drying and calcining the liquid-milled mixture.

The content of the silver nitrate ($AgNO_3$) may be in the range of 0.01 to 0.5 part by weight with respect to the nickel-zinc-copper ferrite powder of 100 parts by weight.

The nickel-zinc-copper ferrite powder may include ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$).

The content of the boron oxide ($B_2O_3$) may be in the range of 0.05 to 1.0 part by mole.

The calcining of the liquid-milled mixture may be performed at 700 to 800° C.

According to yet another aspect of the present invention, there is provided a ceramic electronic component including: a magnetic sheet manufactured by using a magnetic material composition for the ceramic electronic component, including nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$); and an internal electrode formed on the magnetic sheet.

The content of the boron oxide ($B_2O_3$) may be in the range of 0.05 to 1.0 part by mole.

Silver nitrate ($AgNO_3$) may be further mixed with the nickel-zinc-copper ferrite powder.

The content of the silver nitrate ($AgNO_3$) may be in the range of 0.01 to 0.5 part by weight with respect to the nickel-zinc-copper ferrite powder of 100 parts by weight.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
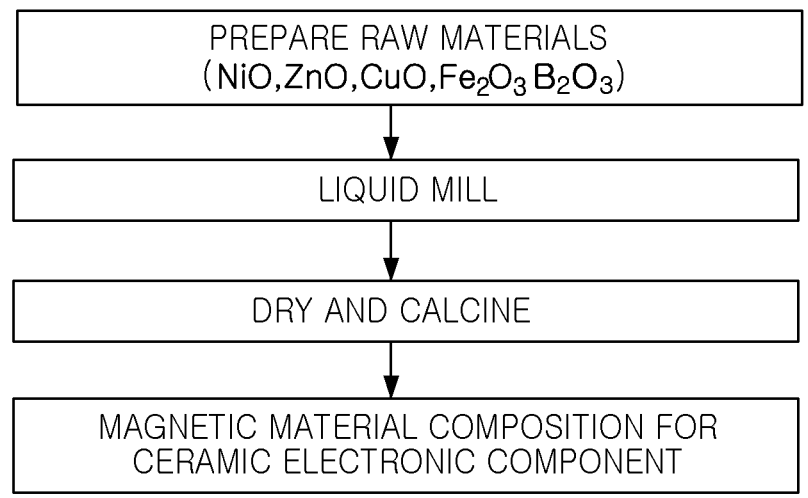
FIG. 1 is a flowchart illustrating a manufacturing process of a magnetic material composition for a ceramic electronic component according to an exemplary embodiment of the present invention.

Exemplary embodiments of the present invention will now be described in detail with reference to the accompanying drawings. The present invention is not limited to the exemplary embodiments and the exemplary embodiments are used to help understanding the spirit of the present invention. Like reference numerals refer to like elements in the accompanying drawings.

A magnetic material composition for a ceramic electronic component according to an exemplary embodiment of the present invention includes nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$).

Ferrite powder is primarily used as a magnetic material of a low-temperature fired magnetic material ceramic component such as a multilayer chip inductor, a multilayer chip bead, a power inductor, and the like. A nickel-zinc-copper ferrite composition contains copper (Cu) in order to improve sintering characteristics.

In the exemplary embodiment, nickel-zinc-copper ferrite including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole is used. In the nickel-zinc-copper ferrite, a composition range allowing for excellent sinterability is optimized considering that sinterability and electrical characteristics are changed depending on the contents of nickel, zinc, copper, and ferric oxide therein.

The magnetic material composition for the ceramic electronic component according to the exemplary embodiment includes boron oxide ($B_2O_3$) substituting for a portion of the ferric oxide ($Fe_2O_3$). In this case, the ferric oxide ($Fe_2O_3$) is reduced by as much as boron oxide ($B_2O_3$) is added. In other words, ferric oxide ($Fe_2O_3$) is reduced and boron oxide ($B_2O_3$) is added in a quantity equal to the amount of reduced ferric oxide ($Fe_2O_3$).

By adding boron oxide ($B_2O_3$), an oxide including $B^{3+}$ having the same ionic charge number as $Fe^{3+}$ of ferric oxide ($Fe_2O_3$), $Fe^{3+}$ is effectively substituted with $B^{3+}$ in ferrite.

In the case where a material added as a sub ingredient is not fully solid-soluble at an A-site or a B-site in a ferrite lattice, a secondary phase such as $Fe_2O_3$ (hematite), CuO, $Cu_2O$, or the like is generated to thereby reduce magnetic characteristics. In order to prevent the second phase from being generated, the content of the ferric oxide ($Fe_2O_3$) is reduced and the boron oxide ($B_2O_3$) is added in a quantity equal to the reduced content of the ferric oxide ($Fe_2O_3$).

According to the exemplary embodiment, the nickel-zinc-copper ferrite powder in which a portion of the ferric oxide ($Fe_2O_3$) is substituted with the boron oxide ($B_2O_3$) may be sintered at a temperature equal to or lower than 951° C., which is the volatile temperature of silver (Ag) used for an internal electrode of a low-temperature fired magnetic material ceramic component such as a multilayer chip inductor. That is, the ferrite powder may be sintered at a relatively low temperature. The reason therefor is that as iron (Fe) is substituted with boron (B) having a small atomic radius, atoms that exist on the surfaces of particles may be more easily moved.

The sintering temperature may be in the range of 880 to 920° C., but the present invention is not limited thereto.

The content of boron oxide ($B_2O_3$) may be in the range of 0.05 to 1.0 part by mole. The content of boron oxide which substitutes for the ferric oxide ($Fe_2O_3$) is limited to a small amount of 1.0 part by mole or less to prevent the secondary phase from being generated.

The magnetic material composition for the ceramic electronic component is used to manufacture a chip inductor, a chip bead, and a ferrite core, and may also be used as a toroidal core shaped inductor material.

The ceramic electronic component has an excellent quality coefficient Q, as the ceramic electronic component is manufactured by using the magnetic material composition for the ceramic electronic component including nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$).

The magnetic material composition for the ceramic electronic component according to the exemplary embodiment may further include silver nitrate ($AgNO_3$). The Silver nitrate ($AgNO_3$) which serves as a sintering promoter reduces the activation energy of atoms that exist on the surfaces of particles, and as a result, the mobility of the atoms increases. Therefore, the silver nitrate may be sintered at a relatively low temperature.

The content of the silver nitrate ($AgNO_3$) may be in the range of 0.01 to 0.5 part by weight with respect to magnetic powder of 100 parts by weight. In the case where the silver nitrate ($AgNO_3$) is mixed at more than 0.5 part by weight, the secondary phase is generated, thereby deteriorating the magnetic characteristic.

FIG. 1 is a flowchart illustrating a manufacturing process of a magnetic material composition for a ceramic electronic component according to an exemplary embodiment of the present invention.

The method of manufacturing the magnetic material composition for the ceramic electronic component according to the exemplary embodiment includes: preparing raw materials including ferric oxide ($Fe_2O_3$), nickel oxide (NiO), zinc oxide (ZnO), copper oxide (CuO), and boron oxide ($B_2O_3$); mixing and liquid-milling the raw materials; and manufacturing a nickel-zinc-copper ferrite powder by drying and calcining the liquid-milled mixture.

First, raw materials such as ferric oxide ($Fe_2O_3$), nickel oxide (NiO), zinc oxide (ZnO), copper oxide (CuO), and boron oxide ($B_2O_3$) are prepared. The raw materials such as ferric oxide ($Fe_2O_3$), nickel oxide (NiO), zinc oxide (ZnO), copper oxide (CuO), and boron oxide ($B_2O_3$) are weighed to acquire ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, copper oxide (CuO) of 7.0 to 13.0 parts by mole, and boron oxide ($B_2O_3$) of 0.05 to 1.0 part by mole.

The weighed raw materials are mixed and liquid-milled.

The weighed materials are mixed with distilled water containing ethanol to manufacture a mixture. Distilled water and ethanol may be mixed with each other at a weight ratio of 100:5. Beads are inputted to the mixture. The amount of the inputted beads may be five times larger than the weight of the mixture. Milling is performed so that the specific surface area of the material is in the range of 3.0 to 5.0 $m^2/g$.

Nickel-zinc-copper ferrite powder is manufactured by drying and calcining the liquid-milled mixture.

The liquid-milled mixture is dried by using a drying oven, or the like, and the dried mixture is calcined. The dried mixture may be grinded and thereafter, calcined. The grinding method may include widely used methods such as milling, and the like.

The calcining is performed at 700 to 800° C. at which a single ferrite phase is generated without generating hematite ($\alpha$-$Fe_2O_3$) of the secondary phase. The reason therefor is that the magnetic characteristic is deteriorated when the secondary phase or hematite ($\alpha$-$Fe_2O_3$) is generated.

The nickel-zinc-copper ferrite powder manufactured according to the exemplary embodiment includes ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$).

The boron oxide ($B_2O_3$) may be in the range of 0.05 to 1.0 part by mole.

The method of manufacturing the magnetic material composition for the ceramic electronic component according to the exemplary embodiment may further include mixing silver nitrate ($AgNO_3$) with the manufactured nickel-zinc-copper ferrite powder after the manufacturing of the nickel-zinc-copper ferrite powder by drying and calcining the liquid-milled mixture. This is to improve sinterability and lower the sintering temperature thereof by mixing the silver nitrate ($AgNO_3$) with the manufactured nickel-zinc-copper ferrite powder.

The content of the silver nitrate ($AgNO_3$) may be in the range of 0.01 to 0.5 part by weight with respect to the nickel-zinc-copper ferrite powder of 100 parts by weight. In the case where silver nitrate ($AgNO_3$) is added at more than 0.5 part by weight, the secondary phase is generated to deteriorate the magnetic characteristics of a sintered body.

Figure 2A:
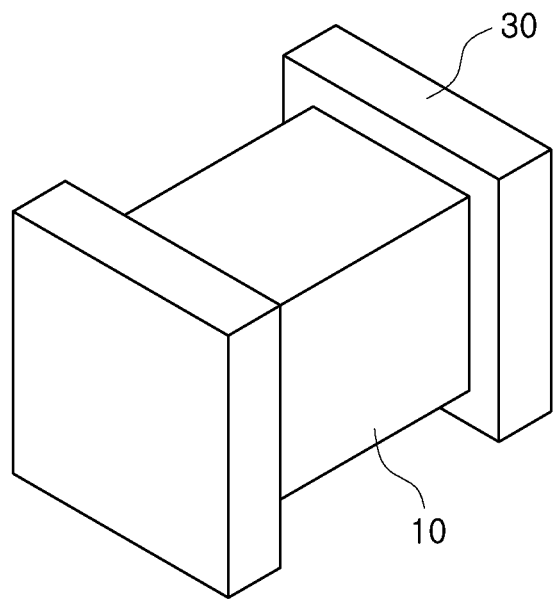
FIG. 2A is a perspective view schematically illustrating an outer part of a ceramic electronic component according to an exemplary embodiment and FIG. 2B is a vertical cross-sectional view of a ceramic electronic component according to an exemplary embodiment of the present invention.
Figure 2B:
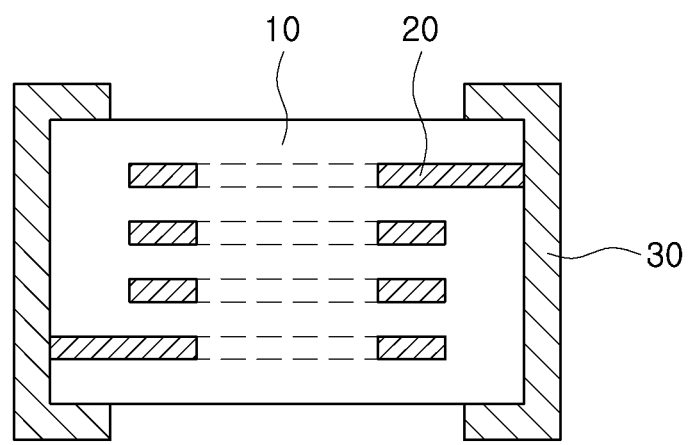
Figure 3:
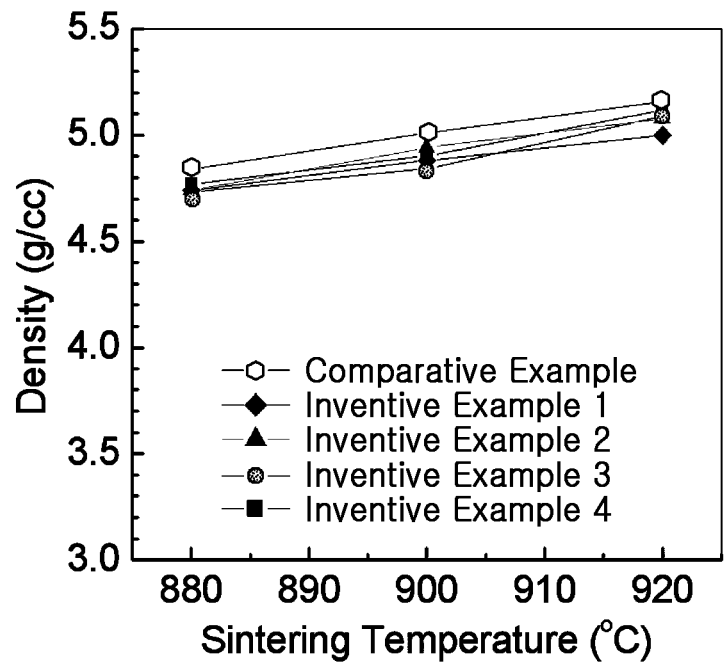
FIG. 3 is a diagram illustrating variations in density depending on the sintering temperature of a ceramic electronic component manufactured by using a magnetic material composition for a ceramic electronic component according to an exemplary embodiment of the present invention.
Figure 4:
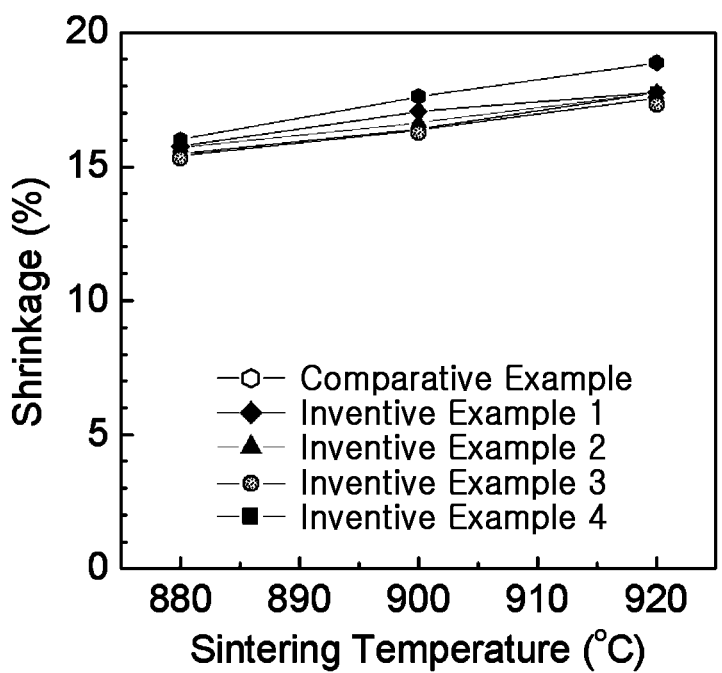
FIG. 4 is a diagram illustrating variations in shrinkage depending on the sintering temperature of a ceramic electronic component manufactured by using a magnetic material composition for a ceramic electronic component according to an exemplary embodiment of the present invention.
Figure 5:
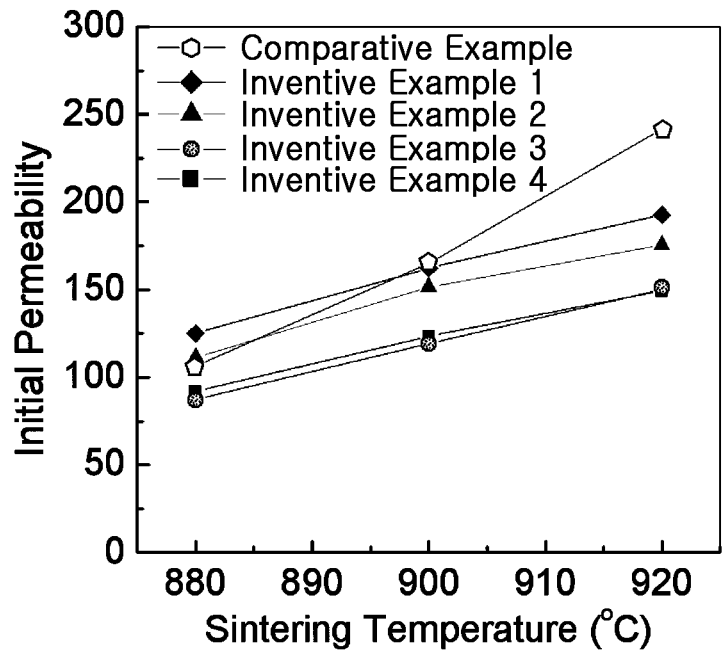
FIG. 5 is a diagram illustrating variations in initial permeability depending on the sintering temperature of a ceramic electronic component manufactured by using a magnetic material composition for a ceramic electronic component according to an exemplary embodiment of the present invention.
Figure 6:
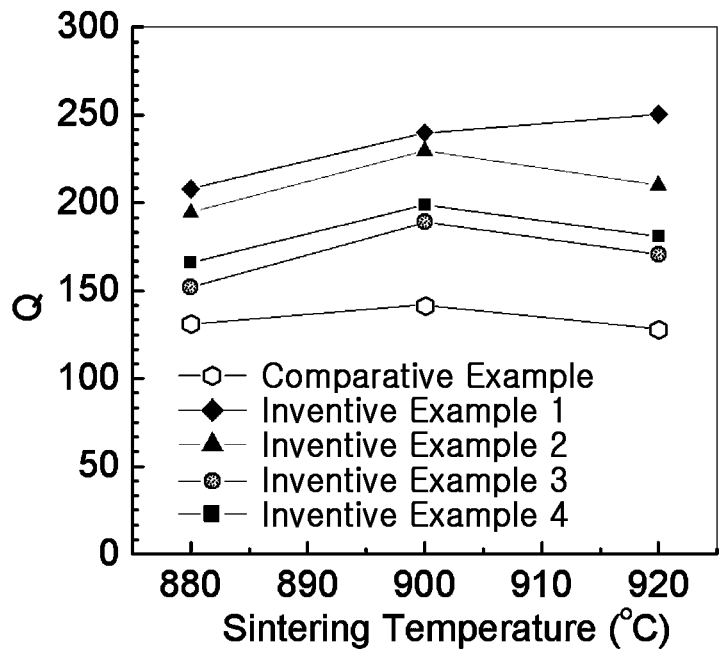
FIG. 6 is a diagram illustrating variations in quality coefficient Q depending on the sintering temperature of a ceramic electronic component manufactured by using a magnetic material composition for a ceramic electronic component according to an exemplary embodiment of the present invention.
Figure 7:
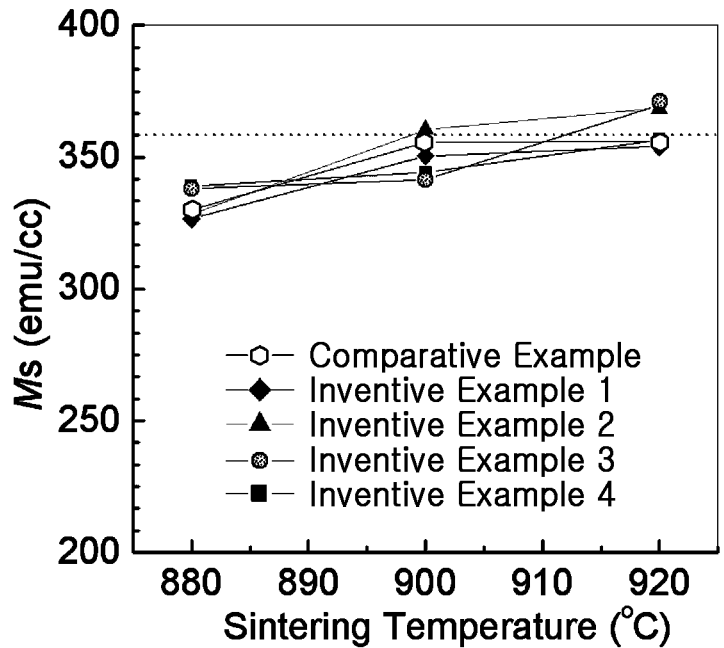
FIG. 7 is a diagram illustrating variations in saturated magnetization Ms depending on the sintering temperature of a ceramic electronic component manufactured by using a magnetic material composition for a ceramic electronic component according to an exemplary embodiment of the present invention.
Figure 8:
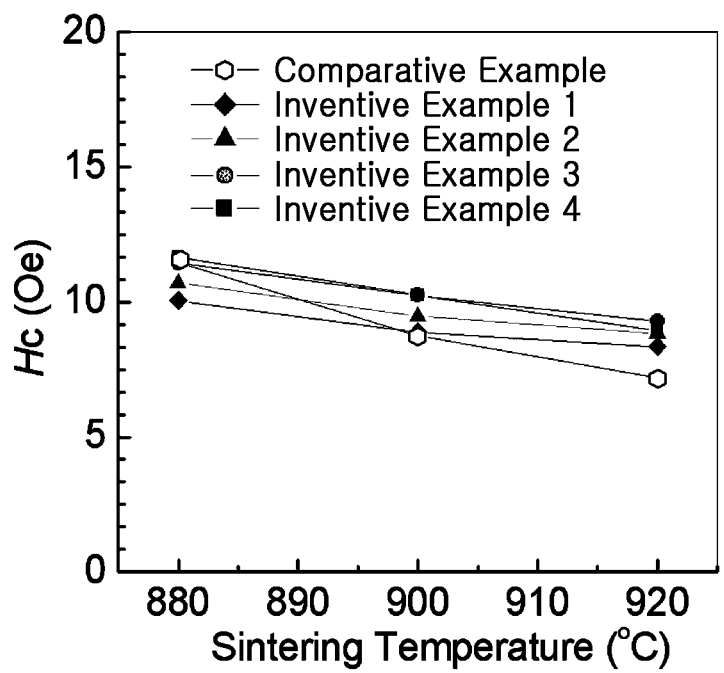
FIG. 8 is a diagram illustrating variations in coercive force Hc depending on the sintering temperature of a ceramic electronic component manufactured by using a magnetic material composition for a ceramic electronic component according to an exemplary embodiment of the present invention.

FIG. 2A is a perspective view schematically illustrating an outer part of a ceramic electronic component according to an exemplary embodiment and FIG. 2B is a vertical cross-sectional view of a ceramic electronic component according to an exemplary embodiment of the present invention.

In the exemplary embodiment, the multilayer inductor among the ceramic electronic components will be described as one example.

The multilayer inductor of the exemplary embodiment includes: magnetic sheets manufactured by using the magnetic material composition for the ceramic electronic component including the nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$); internal electrodes 20 formed on the magnetic sheets; a magnetic body 10 formed by laminating the plurality of magnetic sheets having the internal electrodes formed thereon; and an external electrode 30 that is electrically connected to the internal electrode and formed on the surface of the magnetic body.

The boron oxide ($B_2O_3$) may be in the range of 0.05 to 1.0 part by mole. The content of the boron oxide which substitutes for the ferric oxide ($Fe_2O_3$) is limited to a small amount of 1.0 part by mole or less to prevent the secondary phase from being generated.

Silver nitrate ($AgNO_3$) may be further mixed with the nickel-zinc-copper ferrite powder. This is to improve sinterability and lower sintering temperature by mixing the silver nitrate ($AgNO_3$) with the manufactured nickel-zinc-copper ferrite powder.

The content of the silver nitrate ($AgNO_3$) may be in the range of 0.01 to 0.5 part by weight with respect to the nickel-zinc-copper ferrite powder of 100 parts by weight. In the case where silver nitrate ($AgNO_3$) is more than 0.5 part by weight, the secondary phase is generated to deteriorate the magnetic characteristic of a sintered body.

The magnetic material composition for the ceramic electronic component is used to manufacture a chip inductor, a chip bead, and a ferrite core, and may also be used as a toroidal core shaped inductor material.

Hereinafter, the method of manufacturing the ceramic electronic component will be described in detail.

First, a slurry that includes nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, in which a portion of the ferric oxide is substituted with boron oxide ($B_2O_3$) is manufactured.

The slurry is dried after manufacturing magnetic sheets through a doctor blade method.

Patterns of the internal electrodes 20 are formed by applying electro-conductive paste onto the magnetic sheets by using a method such as silk screening, or the like. The electroconductive paste is manufactured by uniformly distributing conductive metallic powder such as copper (Cu) and silver (Ag) in organic solvents.

A magnetic material laminating body is formed by laminating the magnetic sheets printed with the internal electrodes, and a hole is formed by punching the laminating body and the hole is filled with conductive materials. The internal electrodes 20 separated by the magnetic sheets are electrically connected through the hole.

The ceramic electronic component such as the chip inductor is manufactured by pressing, cutting, and sintering the laminating body.

By such a method, the ceramic electronic component has an excellent quality coefficient Q, as the ceramic electronic component is manufactured by using the magnetic material composition for the ceramic electronic component including nickel-zinc-copper ferrite powder including ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, in which a portion of the ferric oxide is substituted with boron oxide ($B_2O_3$).

Herein, the quality coefficient Q represents a ratio of stored energy to lost energy. As Q increases, the amount of lost energy decreases. The ceramic electronic component is evaluated to have the excellent magnetic characteristic. For example, when Q of a power inductor used in a cellular phone is large, the standby power of the cellular phone is consumed less.

Hereinafter, the present invention will be described in more detail with reference to inventive examples and a comparative example. However, the scope of the present invention is not limited to the example.

INVENTIVE EXAMPLES

First, as ferrite raw materials, nickel oxide (NiO), zinc oxide (ZnO), copper oxide (CuO), and boron oxide ($B_2O_3$) were prepared and weighed, the materials were liquid-milled and dried in a dry oven, and the dried powder was ground and the ground powder was calcined at 750° C.

Next, a magnetic material composition powder for a ceramic electronic component was manufactured by grinding the calcined powder through milling. The manufactured magnetic material composition powder for the ceramic electronic component was composed of ferric oxide ($Fe_2O_3$) of 47.0 to 49.0 parts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, in which a portion of the ferric oxide was substituted with boron oxide ($B_2O_3$).

The content of the boron oxide was changed to 0.2, 0.4, 0.6, and 0.8 parts by mole for the respective inventive examples in order to determine variations in characteristics depending on the content of boron oxide ($B_2O_3$). The content of the magnetic material composition is shown for each inventive example in Table 1.

TABLE 1

| Classification | Composition ratio (parts by mole) | | | | |
| --- | --- | --- | --- | --- | --- |
| | $Fe_2O_3$ | NiO | ZnO | CuO | $B_2O_3$ |
| Comparative example | 49.0 | 18 | 22 | 11 | 0.0 |
| Inventive example 1 | 48.8 | 18 | 22 | 11 | 0.2 |
| Inventive example 2 | 48.6 | 18 | 22 | 11 | 0.4 |
| Inventive example 3 | 48.4 | 18 | 22 | 11 | 0.6 |
| Inventive example 4 | 48.2 | 18 | 22 | 11 | 0.8 |

Referring to Table 1, the amount of boron oxide ($B_2O_3$) was increased by 0.2 parts by mole, and the amount of ferric oxide ($Fe_2O_3$) was decreased by 0.2 parts by mole, such that the sum total of the amounts of boron oxide ($B_2O_3$) and ferric oxide ($Fe_2O_3$) was maintained at 49.0 parts by mole. That is, a portion of the ferric oxide ($Fe_2O_3$) was substituted with boron oxide ($B_2O_3$).

PVA as a binder was added to the magnetic material composition powder, a toroidal core having a diameter of 20 mm and an inner diameter of 13 mm were molded by applying pressure of 2 ton/m², and the molded toroidal core was sintered at each of 880° C., 900° C., and 920° C.

COMPARATIVE EXAMPLE

A toroidal core was manufactured by the same process as the inventive example by using a magnetic material composition in which a portion of ferric oxide ($Fe_2O_3$) is not substituted with boron oxide ($B_2O_3$).

Shrinkage was verified by measuring sizes before and after sintering for inventive examples 1 to 4 and the comparative example and the density of the toroidal core after sintering was measured to verify the sintering characteristics of the ferrite composition.

Further, magnetic characteristics were verified by measuring initial permeability (ui), Q, saturated magnetization (Ms), and coercive force (Hc).

The initial permeability (ui) and Q were measured at 1 MHz after winding a wire around the toroidal core ten times and the saturated magnetization (Ms) was measured after applying an external magnetic field of 0.5 T.

The measurement results are shown in Tables 2 to 4 and further, shown by graphs of FIGS. 3 to 9.

TABLE 2

| Sintering temperature 880° C. | Density (g/cc) | Shrinkage (%) | Permeability | Q | Ms (emu/cc) | Hc (Oe) |
| --- | --- | --- | --- | --- | --- | --- |
| Comparative example | 4.84 | 16.01 | 106.3 | 131.0 | 330.2 | 11.5 |
| Inventive example 1 | 4.74 | 15.77 | 125.0 | 208.0 | 326.5 | 10.0 |
| Inventive example 2 | 4.74 | 15.71 | 111.3 | 194.5 | 328.4 | 10.7 |
| Inventive example 3 | 4.73 | 14.41 | 87.3 | 152.0 | 338.0 | 11.4 |
| Inventive example 4 | 4.77 | 15.47 | 91.7 | 166.0 | 338.9 | 11.7 |

TABLE 3

| Sintering temperature 880° C. | Density (g/cc) | Shrinkage (%) | Permeability | Q | Ms (emu/cc) | Hc (Oe) |
|---|---|---|---|---|---|---|
| Comparative example | 5.01 | 17.61 | 165.0 | 142.0 | 355.6 | 8.8 |
| Inventive example 1 | 4.88 | 17.06 | 162.4 | 240.0 | 350.5 | 8.9 |
| Inventive example 2 | 4.94 | 16.62 | 151.6 | 229.5 | 360.5 | 9.5 |
| Inventive example 3 | 4.84 | 16.35 | 119.4 | 189.0 | 341.4 | 10.2 |
| Inventive example 4 | 4.90 | 16.41 | 123.2 | 199.0 | 344.2 | 10.3 |

TABLE 4

| Sintering temperature 880° C. | Density (g/cc) | Shrinkage (%) | Permeability | Q | Ms (emu/cc) | Hc (Oe) |
|---|---|---|---|---|---|---|
| Comparative example | 5.16 | 18.87 | 241.9 | 128.0 | 355.9 | 7.2 |
| Inventive example 1 | 5.0 | 17.75 | 192.7 | 250.5 | 354.0 | 8.4 |
| Inventive example 2 | 5.08 | 17.75 | 175.6 | 210.0 | 368.5 | 8.8 |
| Inventive example 3 | 5.09 | 17.54 | 150.2 | 170.5 | 369.8 | 9.3 |
| Inventive example 4 | 5.12 | 17.75 | 149.2 | 181.0 | 356.6 | 8.9 |

Measured values of the density, shrinkage, permeability, quality coefficient (Q), saturated magnetization (Ms), and coercive force (Hc) of toroidal cores sintered at 880° C., 900° C., and 920° C. are shown in Tables 2 to 4, respectively.

Referring to Table. 2, in inventive example 1, Q is largest, in inventive examples 2 and 3, Q gradually decreases, and in inventive example 4, Q increases again. However, characteristics other than Q in the inventive examples are equal to or inferior to those of the comparative Example.

Tables 3 and 4 show the same result as Table 2.

Figure 9:
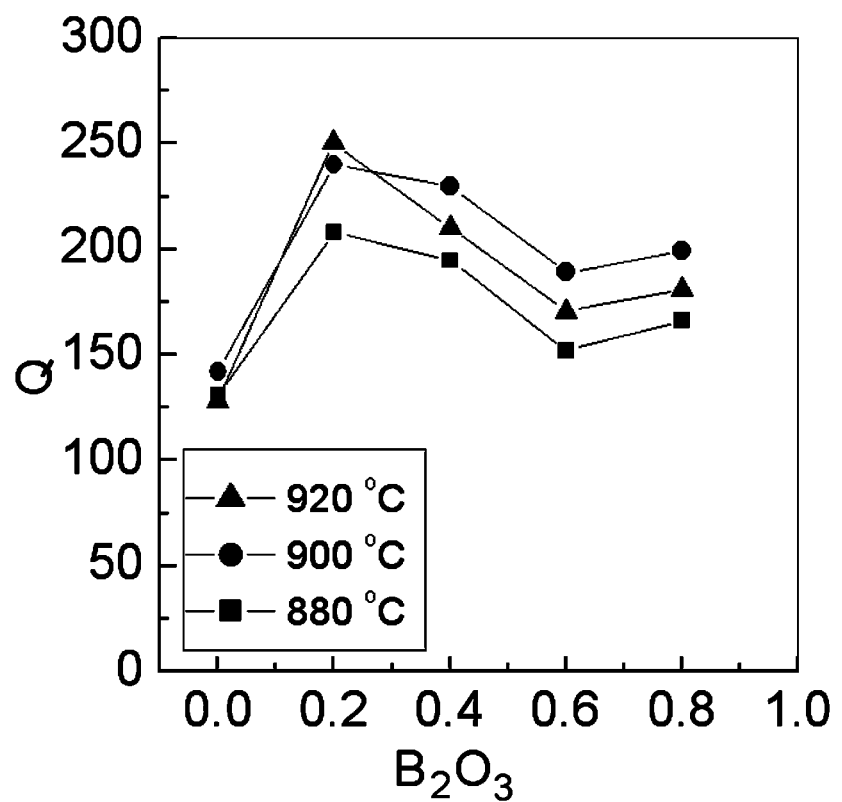
FIG. 9 is a diagram illustrating variations in quality coefficient Q depending on the sintering temperature and the content of boron oxide of a ceramic electronic component manufactured by using a magnetic material composition for a ceramic electronic component according to an exemplary embodiment of the present invention.

FIG. 9 is a diagram illustrating variations in quality coefficient Q depending on the sintering temperature and the content of boron oxide of a magnetic material composition according to an exemplary embodiment of the present invention.

Referring to FIG. 9, in the case where the sintering temperature is at 880° C., 900° C., and 920° C., Q is largest for boron oxide of 0.2 parts by mole, Q decreases as the content of boron oxide ($B_2O_3$) increases after 0.2 parts by mole and thereafter, Q is smallest when the content of boron oxide is 0.6 parts by mole and Q slightly increases after 0.6 parts by mole. Accordingly, the content of boron oxide ($B_2O_3$) may be 0.2 parts by mole at the time of manufacturing the ceramic electronic component.

Q is larger for boron oxide ($B_2O_3$) of 0.2 parts by mole as the sintering temperature is higher. That is, when the sintering temperature is 920° C., Q is largest. However, when the sintering temperature is 920° C., Q rapidly decreases after the content of boron oxide ($B_2O_3$) is 0.02 parts by mole and has a smaller value than Q when the sintering temperature is 900° C.

As set forth above, it is possible to acquire a composition for a ceramic electronic component and a ceramic electronic component having low sintering temperature and an excellent quality coefficient Q.

While the present invention has been shown and described in connection with the exemplary embodiments, it will be apparent to those skilled in the art that modifications and variations can be made without departing from the spirit and scope of the invention as defined by the appended claims. Accordingly, the scope of the present invention will be determined by the appended claims.

What is claimed is:

1. A magnetic material composition for a ceramic electronic component, comprising nickel-zinc-copper ferrite powder including: ferric oxide ($Fe_2O_3$) of 47.0 to 49.0 parts by mole, nickel oxide (NiO) of 16.0 to 24.0 parts by mole, zinc oxide (ZnO) of 18.0 to 25.0 part by mole, copper oxide (CuO) of 7.0 to 13.0 parts by mole, and silver nitrate ($AgNO_3$), wherein a portion of the ferric oxide ($Fe_2O_3$) is substituted with boron oxide ($B_2O_3$).

2. The composition of claim 1, wherein a content of the boron oxide ($B_2O_3$) is in a range of 0.05 to 1.0 part by mole.

3. The composition of claim 1, wherein a content of the silver nitrate ($AgNO_3$) is in a range of 0.01 to 0.5 part by weight with respect to the nickel-zinc-copper ferrite powder of 100 parts by weight.

4. A method of manufacturing a magnetic material composition for a ceramic electronic component, the method comprising:
preparing raw materials including ferric oxide ($Fe_2O_3$), nickel oxide (NiO), zinc oxide (ZnO), copper oxide (CuO), and boron oxide ($B_2O_3$);
mixing the raw materials into a mixture and liquid-milling the mixture;
manufacturing nickel-zinc-copper ferrite powder by drying and calcining the liquid-milled mixture; and
mixing silver nitrate ($AgNO_3$) the manufactured nickel-zinc-copper ferrite powder after the manufacturing of the nickel-zinc-copper ferrite powder by drying and calcining the liquid-milled mixture,
wherein the nickel-zinc-copper ferrite powder comprises ferric oxide ($Fe_2O_3$) of 47.0 to 49.0 arts by mole, nickel oxide (NiO) of 16.0 to 24.0 parts by mole, zinc oxide (ZnO) of 18.0 to 25.0 parts by mole, and copper oxide (CuO) of 7.0 to 13.0 parts by mole, wherein a portion of the ferric oxide is substituted with boron oxide ($B_2O_3$).

5. The method of claim 4, wherein a content of the silver nitrate ($AgNO_3$) is in a range of 0.01 to 0.5 part by weight with respect to the nickel-zinc-copper ferrite powder of 1.00 parts by weight.

6. The method of claim 4, wherein a content of the boron oxide ($B_2O_3$) is in a range of 0.05 to 1.0 part by mole.

7. The method of claim 4, wherein the calcining of the liquid-milled mixture is performed at 700 to 800° C.

8. A ceramic electronic component, comprising:
a magnetic sheet manufactured by using a magnetic material composition for a ceramic electronic component, the magnetic material composition including nickel-zinc-copper ferrite powder including ferric oxide ($Fe_2O_3$) of 47.0 to 49.0 parts by mole, nickel, oxide (NiO) of 16.0 to 24.0 parts by mole, zinc oxide (ZnO) of 18.0 to 25.0 parts by mole, copper oxide (CuO) of 7.0 to 13.0 parts by mole, and silver nitrate ($AgNO_3$), wherein a portion of the ferric oxide is substituted with boron oxide ($B_2O_3$); and
an internal electrode formed on the magnetic sheet.

9. The ceramic electronic component of claim 8, wherein a content of the boron oxide ($B_2O_3$) is in a range of 0.05 to 1.0 part by mole.

10. The ceramic electronic component of claim 8, wherein a content of the silver nitrate ($AgNO_3$) is in a range of 0.01 to 0.5 part by weight with respect to the nickel-zinc-copper ferrite powder of 100 parts by weight.

* * * * *